(12) United States Patent
Snider et al.

(10) Patent No.: US 11,214,743 B2
(45) Date of Patent: Jan. 4, 2022

(54) SYSTEM, METHOD AND APPARATUSES FOR REDUCED-EMISSION MICRO OIL REFINERY

(71) Applicant: Designer Fuels, LLC, Los Angeles, CA (US)

(72) Inventors: George E Snider, Hardeeville, SC (US); Richard J Dyer, Bakersfield, CA (US); Larry M Shultz, Beverly Hills, CA (US)

(73) Assignee: Designer Fuels, LLC, Los Angeles, CA (US)

( * ) Notice: Subject to any disclaimer, the term of this patent is extended or adjusted under 35 U.S.C. 154(b) by 0 days.

(21) Appl. No.: 16/523,279

(22) Filed: Jul. 26, 2019

(65) Prior Publication Data

US 2021/0102126 A1  Apr. 8, 2021

(51) Int. Cl.
| | |
|---|---|
| *C10G 31/10* | (2006.01) |
| *C10G 31/06* | (2006.01) |
| *C10G 53/02* | (2006.01) |
| *C10G 55/02* | (2006.01) |

(52) U.S. Cl.
CPC ............ *C10G 31/10* (2013.01); *C10G 31/06* (2013.01); *C10G 53/02* (2013.01); *C10G 55/02* (2013.01); *C10G 2300/202* (2013.01); *C10G 2300/206* (2013.01); *C10G 2300/308* (2013.01); *C10G 2300/405* (2013.01); *C10G 2300/4006* (2013.01); *C10G 2300/4012* (2013.01); *C10G 2300/4081* (2013.01); *C10G 2300/80* (2013.01)

(58) Field of Classification Search
CPC ........ C10G 31/10; C10G 55/02; C10G 53/02; C10G 31/06; C10G 2300/80; C10G 2300/206; C10G 2300/4081; C10G 2300/202; C10G 2300/4006; C10G 2300/4012; C10G 2300/308; C10G 2300/405; F25B 39/04
See application file for complete search history.

(56) References Cited

U.S. PATENT DOCUMENTS

2011/0084000 A1* 4/2011 Duyvesteyn ............. B01J 19/26
 208/130
2017/0260461 A1* 9/2017 Seccombe ................ C10G 5/06

\* cited by examiner

*Primary Examiner* — Randy Boyer
*Assistant Examiner* — Juan C Valencia
(74) *Attorney, Agent, or Firm* — Mark M. Friedman

(57) ABSTRACT

A system and process for refining crude oil to produce higher-purity, cleaner-burning designer fuels with reduced emissions. The crude oil may be treated with viscosity-reductant additives, which reduces viscosity by up to 50% and increases API gravity by more than 2 points. The method of spray-cracking and vacuum-flashing of crude oil separates light end chains and heavy end chains inside the reactor. The vapor is condensed into designer fuels like bunker, diesel, jet/kerosene fuel, naphtha and gasoline fuel using multi-stage horizontal reverse condensate-condenser. The GVF centrifuges are configured to separate targeted fuels of desired density value as per their ideal fuel densities, which carry out centrifugal polishing to generate targeted fuel products of desired density and hydrocarbon molecules of desired purity values. These designer fuels are further treated with desulfurization additive.

20 Claims, 7 Drawing Sheets

SYSTEM, METHOD AND APPARATUSES FOR REDUCED-EMISSION MICRO OIL REFINERY

TECHNICAL FIELD

The invention generally relates to a modular or micro/mini crude oil refinery that processes 10,000-100,000 barrels of crude oil per day, and more particularly, relates to an environmentally-friendlier and safer, low-temperature and low-pressure system, process and apparatus for refining crude oil with reduced refining emissions to produce higher-purity, cleaner-burning bunker fuels, jet fuels, diesel fuels and gasoline fuels with reduced combustion emissions of SOx and NOx, using a software-controlled automation method to control the production of these designer fuels.

BACKGROUND

The properties of hydrocarbons depend on the number and arrangement of the carbon and hydrogen atoms in the molecules. Hydrocarbons containing up to four carbon atoms are usually gases, those with 5 to 19 carbon atoms are usually liquids, and those with 20 or more carbon atoms are solids. Crude oils range in consistency from water to tar-like solids, and in color from clear to black. An "average" crude oil contains about 84% carbon, 14% hydrogen, 1%-3% sulfur, and less than 1% each of nitrogen, oxygen, metals, and salts. Crude oils are generally classified as paraffinic, naphthenic, or aromatic, based on the predominant proportion of similar hydrocarbon molecules. Mixed-base crudes have varying amounts of each type of hydrocarbon. Refinery crude base stocks usually consist of mixtures of two or more different crude oils. The conventional energy-intensive oil refining process uses chemicals, catalysts, heat, and pressure to separate and combine the basic types of hydrocarbon molecules naturally found in crude oil into groups of similar molecules. The refining process rearranges their structures and bonding patterns into different hydrocarbon molecules and compounds.

Throughout the history of refining, various treatment methods have been used to remove non hydrocarbons, impurities, and other constituents that adversely affect the properties of finished products or reduce the efficiency of the conversion processes.

It is generally accepted fact that $SO_X$ and $NO_X$ emissions from fossil fuel combustion affects human health, especially when combined with atmospheric aerosols that form "acid rain" and more harmful secondary pollutants (including toxic mercury, sulfur oxides, sulfuric acids, nitric acids, hydrogen peroxides) that are absorbed by floating particulate matter and dissolved in rain droplets to exacerbate local air pollution and change the chemistry of local water supplies. Countries today have decades of experience and scientific proof about the effects on agriculture, livestock and humans from burning fossil fuels. No longer are governments tolerating the sun-blocking smog and respiratory harm to their populations caused by unregulated fossil fuel combustion emissions. Scientific studies worldwide estimate that $SO_X$ and $NO_X$ emissions from fossil fuels are responsible for the deaths of 10s of 1000s of children and the elderly, due to respiratory harm from fossil fuel combustion pollutants. Concern for the environmental effects of burning fossil fuels has recently turned to the global maritime shipping industry, where shipping pollution emissions of particulate matter (PM) smaller than 2.5 microns is estimated in recent studies to be responsible for 60,000 premature cardiopulmonary deaths every year as a consequence of ships burning high-sulfur low-purity bunker fuels. Low-grade ship bunker fuel (or fuel oil) can have more than 2,000-3,000 times the sulphur content of low-sulfur diesel fuels used in US and European automobiles. The International Maritime Organization (IMO) used such data to justify enactment of its IMO-2020 regulations for the shipping industry to burn only low-Sulfur bunker fuels in order to reduce harmful Sox and PM emissions from maritime sources. As the fuel market moves to a low-sulfur world, low-$SO_X$ bunker fuels, jet fuels, diesel fuels and gasoline fuels will become the most in-demand fuels in the market. The global move to low-Sulfur fuels is expected to reduce markets and demand for high-sulfur crude oil produced from Middle East based Organization of the Petroleum Exporting Countries (OPEC) countries. "Sour oil"-producing countries, like Saudi Arabia, Iraq, UAE, Kuwait and Mexico face a changing market place for oil, where their "sour" crude oil supplies may have a lower value because it costs refineries much more money to remove the sulfur, than to buy other countries' low-sulfur crude oil at a higher price in the first place.

Based on rising demand for sweet low-sulfur crude oil feedstocks to meet the low-cost needs of global low-sulfur fuel refineries, oil producers must deliver environmentally-friendlier ways to refine raw crude oil, if they want to increase the number of oil refineries worldwide that would want to buy their crude. Reduced-Emission Micro Oil Refineries can enable local markets to "make their own fuels" and in the process reduce the retail cost of bunker, jet, diesel and gasoline fuels to local consumers by removing the high cost of transporting those heavy fuels from 1,000s of miles away. Instead of importing tankers full of already-refined fuels that come burdened with high added transportation costs, a local Micro Oil Refinery could import just the crude oil, and from that raw material produce higher-value higher-purity fuels that can be sold at a local wholesale price that benefit all parties in a cleaner fuel value-chain. The Micro Oil Refinery (MOR) process is substantially different from the conventional pollution-intensive crude oil refining process that uses high-temperature vertical distillation columns to fractionate oil. The MOR achieves its reduced-emission refining status by not using vertical distillation columns, but instead using a novel reverse horizontal condensing method and recycling, in a closed-loop, all of the heat put into the process. By also removing the crude oil impurities separated out by the process and removing the combustion by-products from burning the separated light-end gases for process-heat, the MOR emits reduced refining emissions because it disposes of these separated impurities and process-heating combustion by-products into the final stage asphalt/residuum product. The advantage of the MOR crude oil processing technology is its reduced-emissions that can allow MOR units to be located anywhere in the world without threatening the local environment with the toxic emissions that are usually associated with oil refineries. Until now, virtually all oil refineries in the world have been portrayed as huge toxic emission-belching behemoths—which no informed human would want to live near or work downwind of. Public protests citing health concerns are why fewer and fewer refineries have been built around the world. But with the Micro Oil Refinery being a reduced-emission facility, consumers desirous of reducing their retail cost of fuels should welcome being served by a local oil refinery near them that produces the fuels they need with no threatening refining emissions and for which local consumers won't have to pay the ever-increasing fuel transportation shipping charges passed on to consumers by local fuel wholesalers, corporate customers and retail gas stations. Being the most environmentally-friendly oil refining technology in the world should enable many cities and island nations to take advantage of their market size and fuel needs to justify cost-effective installation of Micro Oil Refineries in their locales as the best means to reduce the cost of fuel to their local customers, while sustaining a more productive and interconnected network of local jobs serving the local wholesale airport, marine/port, diesel fuel and gasoline station owners.

Over the years, numerous prior arts and research-based advancements have received various methodologies, whose systems and strategies have been revealed with respect of limiting the toxic gases emitted from oil refineries. The catalytic cracking methods of crude oils resulting in the separation of hydrocarbons and also techniques for desulfurization, de-nitrification of crude oil have been previously studied by researchers. In various prior arts, the conventional technologies were based on the hydro-cracking process of low-quality feed oil or crude oil. These processes undergo hydro treatment reaction using several kinds of catalysts. The domestic hydro-cracking technology also received a large-scale industrial application. However, the hydro-cracking of a wide range of crude materials yields fuels of superior quality and other synthetic chemical crude materials. The hydro-cracking process and innovation became increasingly more thoughtful in regard to the world's eminent crude oil owners and industries. Subsequently, many prior arts disclose the hydro-treating catalyst in the presence of hydrogen, kerosene, and gas oil. Some of the prior arts describe processes that involves hydro-refining of any of the oil mixture of kerosene and gas oil and further purification done by hydrogenation using the same hydrotreating catalyst. In the early 1940s, another technique came under the knowledge which incorporated alkylation process by using various catalysts to refine petrochemical feedstock to increase gasoline yields and to improve fuel characteristics.

In one of the closest prior art, US2006/0231462A1 which relates to a method and apparatus for improving crude oil using filtration media and pressure application for forcing the crude oil through the filter where cavitation is created. Specifically, it includes a pneumatic pressure source which transports crude into a separator. As the crude passes through the filtration media, it experiences cavitation effects. The cavitation effects impart mechanical and thermal energy that assists in breaking or cracking the hydrocarbons into more valuable lighter hydrocarbons. The cavitation is produced during a backflow of the crude oil through the filter, further forcing the crude oil through a series of filters. In one aspect, the invention transforms crude oil having an API gravity of 26 into crude oil having an API gravity of 35. The process entails improving crude oil filtration where successively the waste residuum is being ejected from the crude oil. The system for improving crude oil using filtration media exerts the pressure differential between 150 and 300 psi depending on the viscosity of the fluid involved, which must be reduced.

In another prior art, CN107345150A discloses a process for hydro-processing heavy oil high nitrogen inferior. The method works under the hydrogenation reaction conditions, where the heavy oil feedstock is sequentially treated with a protecting agent, a contact de-metallization agent, de-nitrification agent, the protecting agent, metal release agent. Each agent contains de-nitrification catalyst which is supported on the catalyst support active metal components, where the protective agent, the release agent and at least one of the metal catalyst support is modified support de-nitrification agent. The modified support containing an acidic stratification adjuvant in a carrier and is gradually increased from the particle surface to the centre of the modified acidic support. The presence of water in the reactor may cause a significant portion of the de-metallization agent and metal oxides to precipitate from the liquid phases and thereby disrupt the process.

In another prior art, U.S. Pat. No. 7,276,152B2, which relates to a process of removing sulfur-containing compounds and nitrogen-containing compounds from liquid petroleum feedstock that are useful for the oxidative process. The extraction solvent used is ammonia and the extractor unit have a pressure in the range of 100 to 600 psig and a temperature which ensures that the ammonia solvent is in liquid phase. The heavy and viscous sulfones and nitrogen oxides accumulates in the bottom of the solvent recovery Column. The process involves transferring the oxidized hydrocarbon feedstock stream into an evaporator or distillation column for carrying out the separation process and to remove the by-product including acids, acetone and acetaldehyde which makes the entire operation an expensive process.

In conventional oil refineries, sulfur is generally removed after the crude oil has been fractionated. Sulfur removal typically comprises utilization of various desulfurization processes, often requiring extreme operating conditions, and incorporation of expensive equipment, often associated with high maintenance costs. Examples of prior art processes for conventional sulfur removal can be found in U.S. Pat. Nos. 1,942,054; 1,954,116; 2,177,343; 2,321,290; 2,322,554; 2,348,543; 2,361,651; 2,481,300; 2,772,211; 3,294,678; 3,402,998; 3,699,037; and 3,850,745, the disclosure of each of which is hereby incorporated herein in its entirety for all purposes not contrary to this disclosure.

In one of the closest prior art U.S. Pat. No. 4,885,080A, the invention discloses a process for producing a synthetic crude oil of improved properties by desulfurizing, denitrogenating and de-metallizing a heavy crude oil feedstock by separating the crude oil into several fractions which are selectively hydro-treated. The feedstock being a crude oil having an average boiling point at least as high as 500° F., an API gravity less than 20 at 60° F., and containing at least 1 weight percent sulfur. The process entails initially vacuum or atmospheric fractionating a heavy crude charge stock to provide at least three liquid fractions include naphtha, distillate and heavy residuum. The process includes hydro-desulfurization zone which include a very high temperature in the range from about 550° F. to about 850° F. and a hydrogen partial pressure from about 250 psig to about 900 psig. The desulfurized-demetallized residuum is then recombined with the naphtha and/or distillate fractions to produce the synthetic crude oil constituting the end product. Therefore, it is energy exhaustive process as desulfurization zone alone operates at temperatures of 550° F. to 850° F. and pressure from 250 psig to 900 psig.

A prior art, U.S. Pat. No. 5,858,766A discloses a process for the biochemical conversion of a feedstock of heavy crude oils. More specifically, heavy crude oils are treated with modified and adapted biocatalysts including biologically defined and pure strains of bacteria which have been selected through nutritional stress under challenge growth processes to utilize for growth complex hydrocarbon and heteroatom containing compounds found in heavy crude oil. The process for upgrading heavy crude oil wherein saturated hydrocarbons of said heavy crude oil are from about 10.3% to about 19.2% by weight, said resins of said heavy crude oil are from about 25% to about 45% by weight, said asphaltenes of said heavy crude oil are from about 4.4% to about 56.0% by weight. The underlying biochemical process of the invention occurs at a pressure from atmospheric to about 2500 psi and contacting heavy crude oil with a bacterial strain occurs from 24 hours to 50 hours. However, it is heavy process and requires extensive secondary and tertiary recovery technology. The problems which are mainly encountered with these processes include bacterial strain availability, economic value and refinery wastes. Other problems linked to processes with contacting crude oil with bacterial strains include plugging of the reservoir rock by the bacterial mass in undesirable locations and acidification of the crude oil by the bio production of hydrogen sulfide in the reservoir.

In another prior art, JP5346036B2, relates to the process to upgrade heavy crude oil for producing more valuable crude feedstock. To form a modified feed containing nitrogen and metal components, the hot pressurized acoustic critical water is contacted with the feedstock. The asphaltene components are reduced which increases middle distillate yield. The upgrade heavy Crude oil having a 27.4 API gravity combined with feed water in the presence of crude oil having a pour point of 34.3 or higher API gravity and 86° F. (30 ▫) than, modified oil/water mixture. The process operates at high temperature range of about 705° F. to about 1112° F. (374 ▫ -600 ▫). The modified oil/water mixture is made in the absence of hydrogen and further no catalyst is supplied from the outside. The presence of water in the oxidation reactor also causes a significant portion of the peroxides and organic oxides to precipitate out from the liquid phases. The presence of water in the reactor may sometimes disrupt the operation of the reactor.

In one of the closest prior art, US2019/0040329A1, it encompasses a multi-stage device for the production of a product heavy marine fuel oil from distressed fuel oil materials. The device comprising pre-treating of the distressed fuel oil materials into a feedstock heavy marine fuel oil, means for pre-treating being selected from the group consisting of various types of distillation columns. The process further includes step of mixing a quantity of the pre-treated feedstock heavy marine fuel oil with a quantity of activating gas mixture to give a feedstock mixture and contacting with metal catalysts to form a process mixture. The process where the product heavy marine fuel oil has bulk properties of a kinematic viscosity at 50° C. between the range from 180 mm$^2$/s to 700 mm2/s; a density at 15° C. between the range of 991.0 kg/m$^3$ to 1010.0 kg/m$^3$, the total pressure is between 250 psig and 3000 psig; and the temperature is between 500° F. to 900° F. However, the process operates at a high pressure and a high temperature which is usually higher than the conventional techniques. The problem is that distressed fuel oil and residues contain high-sulfur concentration, nitrogen; asphaltenes shows a tendency to form carbon or coke on the high-cost catalyst, thereby altering its function and wasting money in the process.

In another prior art US2017/0260461A1, a process for separation of the lighter hydrocarbon fractions from the heavier fractions of hydrocarbon oil feedstock which performs sparging and reverse distillation techniques known in the art. Such inventions use costly heaters to separate out asphaltenes and paraffins from the crude oil. Further, prior art use of the sparging technique, performed in the reactor tank for cracking the crude oil, is comparatively inefficient, while the added cost of the sparging gases (like methane, helium, nitrogen, butane, carbon dioxide or any other inert gas introduced into the reactor vessel along with crude feedstock to complete the cracking process) only further increases the cost of the refining processes that use sparging.

In another prior art, US2008/0253426A1, the invention relates to a method of assaying a hydrocarbon-containing feedstock, such as refinery feedstock crudes, synthetic crude-oils, partially refined intermediate fractions such as a residue component or a cracked stock component, bio-components or blends thereof, and petroleum exploration pre-production test well samples. The method generally measures boiling profile and other properties of the hydrocarbon-containing feedstock and transmits the measurements made to a processor capable of reconstructing a determinative assay. The method is capable of measuring the properties selected from the group consisting of density, specific gravity, total acidic number, pour point, viscosity, sulfur content, metal content, nitrogen content, and combinations thereof. Therefore, a micro oil refinery automation system must be capable of calculating the extraction amounts of the left-over heavy oil residuum, left-over asphaltenes, and the left-over liquified Paraffin from the heavy oil Residuum to analyze the residual wastes. Further, automation systems must be able to measure, record and count all the compounds that are first entering and subsequently exiting out of the process.

The aforementioned inventions in the field of crude-oil processing also discuss crude oil-separation processes, apparatus and techniques. In the crude-oil processing methods known in the above prior arts, they possess several limitations and drawbacks which need to be overcome. The prior arts have limited scope to address the problems encountered and they are less efficient in minimizing the $SO_X$ and $NO_X$ emissions, increasing fuel lubricity and burn-efficiency in engines. Moreover, they are incapable of achieving the so-called targeted low-sulfur and low-nitrogen emission fuels. Most of the crude oil refining process utilizes high pressure and elevated temperature condition for cracking of hydrocarbon. Moreover, most of these prior art processes use costly heaters, requiring costly fuels for high-temperature heat to break the asphaltenes and paraffins from the crude. And these prior art processes are inefficient, because they do not completely recycle, nor use, the exhaust gases and left-over contaminants from their processes into a valuable residuum or asphalt by-product. While such prior art processes and techniques endeavor to solve one problem, they create other problems due to their processes being too energy intensive or cost intensive or uneconomical or inefficient or more pollutive.

In order to overcome the aforementioned problems, there is a strong need and demand for a better approach for designing a crude oil refining process to cost-efficiently extract high-purity and cleaner-burning fuels produced from any kind of heavy or light, sweet or sour crude oil feedstock with reduced or minimal refining emissions and environment impact.

SUMMARY OF THE INVENTION

The invention overcomes the above problems by disclosing a cost-efficient system and a process of refining crude oil to extract higher-purity, cleaner-burning designer fuels, like diesel fuel, gasoline fuel, jet/kerosene fuel, bunker fuel and a chemical-rich asphalt/residuum, from any kinds of heavy or light, sweet or sour crude oil feedstock, to produce reduced combustion emissions of SOx, NOx and other unwanted pollutants into the atmosphere.

In the preferred embodiment of the present invention, a system for refining crude oil to produce high purity, cleaner-burning designer fuels in a micro-crude oil refinery with reduced refining emissions is described. The system comprises of three sections: a crude section, a vapor section and a condensate section. The crude section comprises of following devices: a crude oil stock tank, a plurality of heat exchangers, a chemical additive tank, a plurality of centrifugal pump or positive displacement pump, a plurality of valves and a reactor. The crude oil stock tank stores the crude oil feedstock. The plurality of heat exchangers heats up the crude oil to optimum temperature range according to the flow of crude oil to different devices and the movement of crude oil is controlled by plurality of valves. The chemical additive tank stores the viscosity-reductant additive which is contacted with the crude oil to breakdown heavy chain hydrocarbons into light chain hydrocarbon. The pre-treatment of the crude oil with a low-cost viscosity-reductant additive reduces the viscosity and increases API gravity of the crude oil. The centrifugal pump or positive displacement pump is configured to properly mix the crude oil with the viscosity-reductant additive. The hot crude oil enters into the reactor which is designed to carry out two novel methods of spray cracking and vacuum flashing of the crude oil to separate out heavy chain hydrocarbon, light chain hydrocarbon and by-products. This method of spray-cracking and vacuum-flashing uses less energy and is more efficient than conventional methods, and can be completely automated.

The condensate section comprising a multi-stage horizontal reverse condensate condenser, a plurality of cooling equipment, a plurality of fuel stock tanks, a plurality of GVF centrifuges, a plurality of Fraction sulphur reducer (FSR), a plurality of output storage tanks. An important aspect of the present invention is a horizontal reverse condensate method to efficiently separate out different fuel fractions of crude oil. The light chain hydrocarbon coming from the reactor enters into the multi-stage horizontal reverse condensate condenser in the form of vapor. The multi-stage horizontal reverse condensate condenser configured to comprise at least three stages to condense the vapor into targeted fuel products. The cooling equipment is attached to each stage of the reverse condensate condenser to condense the vapor into targeted fuel products. The condensed fuel products get collected into each of the respective fuel stock tank. The targeted fuel products pass through each of GVF centrifuges which are configured to operate by density differentials to separate targeted fuels of desired density value as per the ideal fuel densities in the range from 0.7 kg/m$^3$ to 1010 kg/m$^3$ at a temperature of 15° C. The fuels are subjected to centrifuge-polishing in order to generate targeted fuel products of desired density and hydrocarbon molecule of desired purity values. The hydrocarbon molecule-purity is enhanced by removing the unwanted burn-inhibiting impurities in crude oil, whose molecular densities are outside the density value of the desired fuel molecules and are therefore rejected from the centrifuges. It further comprises an additive storage tank that stores an emissions-reductant additive. The targeted fuel products are contacted with emissions-reductant additive that is injected out from the additive storage tank to further remove unwanted pollutants from the designer fuels to reduce $SO_X$ and $NO_X$ emissions. Finally, these designer fuels and by-products are collected into respective output storage tank and are sent for sale to retailers or wholesale market. The vapor section comprises of a vapor trap tank, a plurality of separator, a plurality of blowers and a plurality of process heaters. The vapor and gases which are not condensed in the multi-stage horizontal reverse condensate condenser are collected into the vapor trap tank. The plurality of blowers configured to increase the velocity and pressure of gases and vapor released from the vapor trap tank. The plurality of process heaters configured to burn the gases extracted from processed crude oil. The separator removes any entrapped non-condensable gases before passing the gases into the plurality of process heaters.

In another embodiment, the designer fuels are selected from diesel fuel, bunker fuel, jet/kerosene fuel, naphtha fuel, a gasoline fuel, a grade 2 diesel fuel (#2 diesel), a grade 4 diesel fuel (#4 diesel). The diesel fuel extracted from the process is grade 2 diesel fuel (#2 diesel) and the bunker fuel extracted from the process is grade 4 diesel fuel (#4 diesel). The different grade of the diesel fuel is based on the cetane number of the fuel. The by-products obtained from the processed crude oil are selected from asphalt, paraffin, chemical-rich residuum. The system is a closed-loop system with reduced crude oil refining emissions because the system recycles the crude oil to extract all the components separated and released from the crude oil feedstock and all the gases extracted from the crude oil process are utilized within the system to burn the process heaters.

In the preferred embodiment of the present invention, the embodiment provides a process for refining crude oil to produce designer fuels with desired hydrocarbon-chain configurations that are predominantly free from attachment of impurities, that burn more efficiently and with reduced emissions, comprising four stages: a crude stage, a vapor stage, a condensate stage and a residuum stage. The crude stage comprises the initial flow of the crude oil from the crude oil stock tank with an ambient temperature of 120-200° F. and an ambient pressure of 100-200 psi. The crude is passed through the centrifugal pump or a positive displacement pump, which raises the pressure of the crude oil to 200-1000 psi. The crude oil from the centrifugal pump or positive displacement pump is either passed to a bunker fuel stock tank or the crude oil is passed through the heat exchanger. The movement of crude oil is controlled by a plurality of valves. In the bunker fuel stock tank, the crude oil comes in contact with the viscosity-reductant additive selected from Surfsol solvent, surfactants, emulsions, solvent or combination of solvents, which are injected from the viscosity-reductant additive storage tank. The centrifuge pump properly mixes the viscosity-reductant additive with the crude oil. The crude oil is pre-heated in the pre-heat heat exchanger to the temperature of 200-500° F. which is connected to the first stage of a multi-stage horizontal reverse condensate condenser. Then, the crude oil is sent into the reactor in either of two ways to raise the temperature to an optimal temperature of 200-600° F. One of the ways involves passing of the crude oil through a pair of electric heaters or through a plurality of heat exchangers controlled by a plurality of valves to raise the temperature of crude oil to optimal temperature of 200-600° F. The hot crude oil enters into the reactor, where the pressure inside the reactor is in the range from 0 to 29 inches of mercury Hg. The crude oil enters through plurality of nozzles and process devices into the reactor which reduces the size of crude oil to 10-120 microns in order to form atomized crude particles. The atomized crude particles are sprayed into the vacuum condition at the pressure range from 200-1000 psi and temperature range of 200-600° F. which results in spray-cracking and vacuum-flashing of the atomized crude particles, which separates the atomized crude particles into light end chains and heavy end chains. The light end chains pass through the separator located inside the reactor and enters into a multi-stage horizontal reverse condensate condenser in vapor form and the heavy end chains falls through the sides of the reactor and is collected into the sump of the reactor as a residuum.

The vapor stage comprises the movement of vapor from the multi-stage horizontal reverse condensate condenser into a vapor trap tank. The light end chain which does not condense in the condenser is recovered into the vapor trap tank. These gases collected in the vapor trap tank are either passed through a vapor recovery unit (VRU) into a process heater or the gases are passed to a pair of methane heaters and sent into the reactor. These gases pass through the small blower to a vapor recovery unit (VRU) and into the process heater. The gases, like methane, pass to a pair of methane heaters using a pair of main blowers that increases the velocity and pressure of the gas flow. These gases coming from methane heater are heated to a temperature equal to the temperature inside the reactor before entering into the reactor. The gases enter into the reactor through a plurality of nozzles and process devices and these gases carry the atomized crude particles with carrying velocity range of 3-12 feet per second to the separator inside the reactor. The light end chains in the form of vapor passes through the separator located inside the reactor and the heavy end chains are collected into the sump of the reactor.

The condensate stage comprising the passage of vapor into the multi-stage horizontal reverse condensate condenser where the vapor condensed into respective fuel products. The multi-stage horizontal reverse condensate condenser has at least 3 stages or compartments to condense the vapor, where the outputs from all the stages are based upon the inlet temperature coming from the cooling medium. The inlet temperature of the vapor coming from reactor 200-600° F. are condensed by reducing the temperature of the vapor to the optimum temperature range from 200-150° F. using a cooling medium from the pre-heat heat exchanger to form the diesel fuel in the first stage of the multi-stage horizontal reverse condensate condenser. The second stage takes vapor with inlet temperature of 200-150° F. from the first stage and reduces the temperature to optimum temperature range of 170-50° F. using a fin fan or similar device to obtain the jet fuel or kerosene in the second stage. Further, the third stage takes the inlet temperature of the vapor in range 170-50° F. from the second stage and reduces the temperature to optimum temperature range from 60-20° F. using chillers or a similar device to obtain the naphtha fuel or the gasoline fuel.

The vapor from the first stage is collected as the diesel fuel into diesel fuel stock tank. The vapor from the second stage of the multi-stage horizontal reverse condensate condenser is collected as the jet fuel into a jet fuel stock tank or as kerosene in the kerosene stock tank. The vapor from the third stage of the multi-stage horizontal reverse condensate condenser is collected as the naphtha fuel or the gasoline fuel into a naphtha or gasoline stock tank. Moreover, the bunker fuel is extracted from the reactor and collected into a bunker fuel stock tank. The asphalt extracted from the reactor is collected into an asphalt stock tank. The designer fuels from respective stock tank passes through plurality of centrifugal or positive displacement pumps. The designer fuels are then passed into a gas void fraction (GVF) centrifuge to remove unwanted carbon chains and impurities based on their density in order to improve the burning efficiency and reduce toxic emissions. The GVF centrifuge operates by density differentials to separate out designer fuels of desired density value based on ideal densities of the designer fuels. It carries out centrifugal polishing to generate designer fuels of desired density and hydrocarbon molecule of desired purity values. The designer fuels are re-circulated from the gas void fraction (GVF) centrifuge back into respective stock tanks using the plurality of valves. These designer fuels are then sent through fraction sulphur reducer (FSR), where each of the designer fuels comes in contact with the desulfurization ester additives which reduce combustion emissions like $SO_X$ and $NO_X$ from the fuel products. Finally, the diesel fuel from the FSR is collected into a diesel fuel output storage tank. The bunker fuel coming from the FSR is collected into a bunker fuel output storage tank. The jet fuel/kerosene coming from FSR is collected into a jet/kerosene fuel output storage tank. The jet fuel and kerosene fuel extracted from the process is dependent on the carbon chain of the processed crude oil. The naphtha fuel and the gasoline fuel are separated from each other. The separation is carried out by removing the unwanted carbon chains and pollutants from the naphtha fuel and the purified fuel is then pumped as the gasoline fuel. The naphtha fuel is collected into a naphtha fuel output storage tank and gasoline fuel is stored into a gasoline fuel output storage tank.

The residuum stage comprises the following steps: the residuum collected in the sump of the reactor is re-circulated back into the reactor for further extraction. The residuum is sent for a primary processing by re-circulating throughout the process to obtain a first residuum. The residuum is sent from the sump of the reactor through plurality of centrifugal or positive displacement pumps and a plurality of heat exchanger for recirculation. The first residuum is sent to a secondary processing, where the first residuum is further re-circulated throughout the process to finally obtain a chemical-rich residuum. Finally, the asphalt is extracted from chemical-rich residuum which is collected into an asphalt output storage tank. Paraffins in liquid form are also recovered from the chemical-rich residuum. The bunker fuel collected in the sump of the reactor are sent to the bunker storage tank.

In another embodiment, the viscosity-reductant additive selected from Surfsol solvent, surfactants, emulsions, solvent or combination of solvent reduces crude oil viscosity by up to 50% and increases API gravity by more than 2-points. This viscosity-reductant additive treatment leaves only the lighter-end carbon chains that require less energy to process, since many of the contaminants, like asphalt and paraffin, attached to the carbon chain molecules have been removed by breaking the bonds between them after the treatment with viscosity-reductant additive, putting these hydrocarbons back into solution for further processing.

In yet another embodiment, the desulfurization ester additive comprises an ester solvent. The ester solvent is selected from the group of methyl octanoate, methyl laurate, trimethylolpropanetrilaurate, pentaeythritoltetralaurate and dipentaerythritolhexaheptanoate. In an embodiment, the desulfurization ester additive is added at a ratio of 1 ounce of the desulfurization ester additive to 10 gallons of the designer fuel. The ester additive reduces the emissions comprising $SO_X$ by up to 40% and $NO_X$ by up to 10% from combustion of the designer fuels.

In another embodiment, the process heaters are heated with utility-grade natural gas, when there is a shortage in the aromatic gases extracted from the process. To make up for such short-fall, the process opens plurality of valves to deliver the utility-grade natural gas into the process heaters.

In another embodiment, the process of production of the designer fuels is based on input density of the crude oil and an output density of the designer fuel. The GVF centrifuges in the process operate to achieve the ideal fuel densities of the designer fuels in the range from 0.7 kg/m³ to 1010 kg/m³ at temperature of 15° C.

In another embodiment, the process for refining crude oil to produce designer fuels is a closed-loop process. All combustible by-products of the processes are recovered in a closed-loop and recycled in order to reduce the operating temperatures, pressures, heat and electricity costs of the fuel-making process. The process optimizes closed-loop energy efficiency by recycling all of the components separated out of and released by the crude oil in the process. The combustible hydrocarbon gases are utilized within the process, for flame-combustion in the process heaters, and for mixing with, and breaking-down, longer-chain hydrocarbon molecules.

In one of the preferred embodiments, a method for automating daily selection of the designer fuels from the process which comprises following steps. The first step involves the electronic-tracking of a crude oil feedstock delivered into a refinery. Then, the physical and chemical characteristics of the crude oil feedstock are analysed. The next step is to determine current market value for each of bunker fuel, jet fuel, diesel fuel, naphtha fuel, gasoline fuel and chemical-rich residuum/asphalt. Based on these characteristics and market value, the most valuable designer fuels and chemical rich residuum obtained from the crude oil feedstock are calculated. Further, the amount of the first residuum to be subjected for the secondary processing is calculated. Then, the amount of the chemical-rich residuum obtained after the secondary processing is determined and calculated. The amount of asphaltenes and paraffins in liquid form to be extracted from the chemical-rich residuum is calculated. The next step is changing the output from the process to produce the most valuable designer fuels and the chemical-rich residuum. The output ratios of the designer fuels and the chemical-rich residuum by volume are calculated on each day according to highest values. Finally, metering the processing and sale of the designer fuels and the chemical-rich residuum by recording weights and volumes of inputs of crude oil feedstocks, inputs of the Surfsol solvents and the desulfurization ester additive, electrical and thermal energy inputs and the corresponding designer fuels and the chemical-rich residuum outputs. Therefore, the process embraces an excellent method of automation of the crude oil processing for tracking, storing and converting a given input-density of crude oil into a given output-density of refined fuels, according to the real-time market value of each potential ratio of fuel products that can be produced based on the composition of input crude oil feedstock.

In another embodiment, the physical and chemical characteristics of the crude oil feedstock are selected from the group of Viscosity, API Gravity, Sulfur-content, Paraffin-content, Asphaltene-content, Aromatics-content, Water-content, Sediment-content, vanadium-content, nickel-content. In one of the embodiments, the method for automating daily selection of the designer fuels is performed using a production auditing or accounting control system operated with a software program. The production auditing or accounting control system calculates profitable ratios of the most in-demand designer fuels based on the physical and chemical characteristics of the input crude oil feedstock on a daily basis.

In one of the preferred embodiments, a reactor apparatus for spray-cracking and vacuum-flashing of crude oil in a system for refining crude oil to produce high purity, cleaner-burning designer fuels with reduced refining emissions is disclosed, comprising the following components: a plurality of nozzles designed to reduce the molecular size of the crude oil to form atomized crude particles having the molecular size from 10-120 microns, which are sprayed at a pressure range from 200-1000 psi and having a temperature range from 200-600° F. The pressure maintained inside the reactor is from 0-29 inches of Hg. The atomized crude particles are sprayed into vacuum condition inside the reactor resulting in the spray-cracking and vacuum-flashing of the atomized crude particles. Further, the reactor has a first input configured to receive gases and vapor from the first main blower, and a second input configured to receive gases and vapor from the second main blower. The gases and vapor from the first input and the second input carry the atomized crude particles at a carrying-velocity from 3-12 feet per second. It further comprises a separator located inside the upper portion of the reactor to separate light chain hydrocarbons and heavy chain hydrocarbons from the crude oil where the light chain hydrocarbons pass through the separator, and the heavy chain hydrocarbon are forced to fall through the sides of the reactor into a sump of the reactor. A plurality of pumps is connected to the sump of the reactor, and the heavy chain hydrocarbon from the sump is re-circulated back into the reactor using a recirculation pump to further extract the designer fuels and by-products. Each of the pumps is arranged to separate the designer fuels and the by-products. A plurality of output storage tanks is connected to the sump of the reactor to store the different designer fuels and by-products obtained from the reactor.

In one of the preferred embodiments, a horizontal reverse condensate condenser apparatus in a system for refining crude oil to produce high purity, cleaner-burning designer fuels with reduced refining emissions is disclosed. The horizontal reverse condensate condenser apparatus comprises at least three stages, or fuel compartments, to separate the crude oil into targeted fuel products. Each of the stages or the compartments is connected to cooling equipment, like fin fan, chiller, heat exchanger and similar cooling devices. Each of the cooling equipment sends a cooling medium to its connected fuel compartment or stage to condense the vapor of the crude oil into the targeted fuel product for that compartment stage. Moreover, the horizontal reverse condensate condenser apparatus is configured to direct the flow of the vapor in a horizontal direction to condense the vapor at different temperatures into separate fuel compartments or stages, which condensed fuel droplets get collected at the bottom of the fuel compartment stages.

In another embodiment, the horizontal reverse condensate condenser apparatus comprises three stages or fuel compartments. The inlet temperature of the vapor from the reactor, in a range from 200-600° F., is reduced to an optimum temperature range from 200-150° F. to form a diesel fuel in a first stage or compartment of the condenser apparatus. The second stage or compartment takes vapor with the inlet temperature in range of 200-150° F. from the first stage and reduces the temperature to the optimum targeted temperature range of 170-50° F. to obtain a jet fuel or kerosene fuel. The third stage or compartment takes vapor with the inlet temperature in range of 170-50° F. from the second stage and reduces the temperature to optimum temperature range from 60-20° F. to obtain a naphtha fuel or a gasoline fuel.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIGS. 1A-1D are enlarged quadrants of FIG. 1, wherein FIG. 1A is the lower right quadrant and illustrates primarily the section of initial crude flow through the process; FIG. 1B is the upper right quadrant and illustrates primarily the reactor section and outputs of the bunker fuel and asphalt from the reactor; FIG. 1C is the upper left quadrant and illustrates primarily the multi-stage horizontal reverse condenser section and corresponding outputs from each stage; and FIG. 1D is the lower left quadrant and illustrates primarily outputs of designer fuels through the gas void fraction (GVF) centrifuges and Fraction sulphur reducer (FSR) into respective output storage tank.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein achieve this by providing a system and process of refining the crude oil feedstock into high purity, high burning efficiency designer fuels namely Jet fuel/Kerosene fuel, diesel fuel (#2 diesel fuel), gasoline fuel, naphtha, bunker fuel (#4 diesel fuel) and chemical-rich residuum with reduced crude oil refining emissions.

Figure 1:
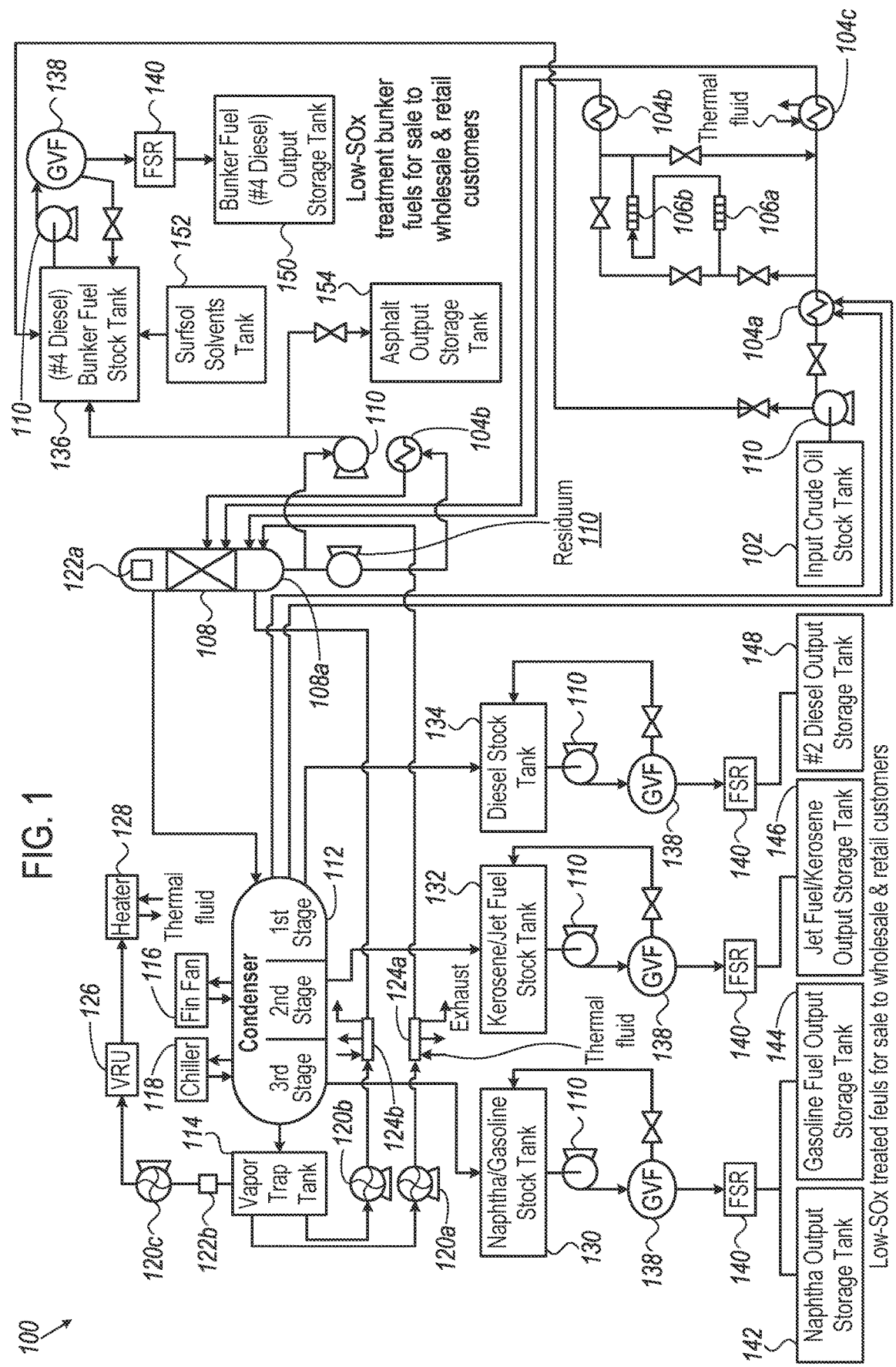
FIG. 1 is a process flow diagram of an embodiment of the invention.
Figure 1A:
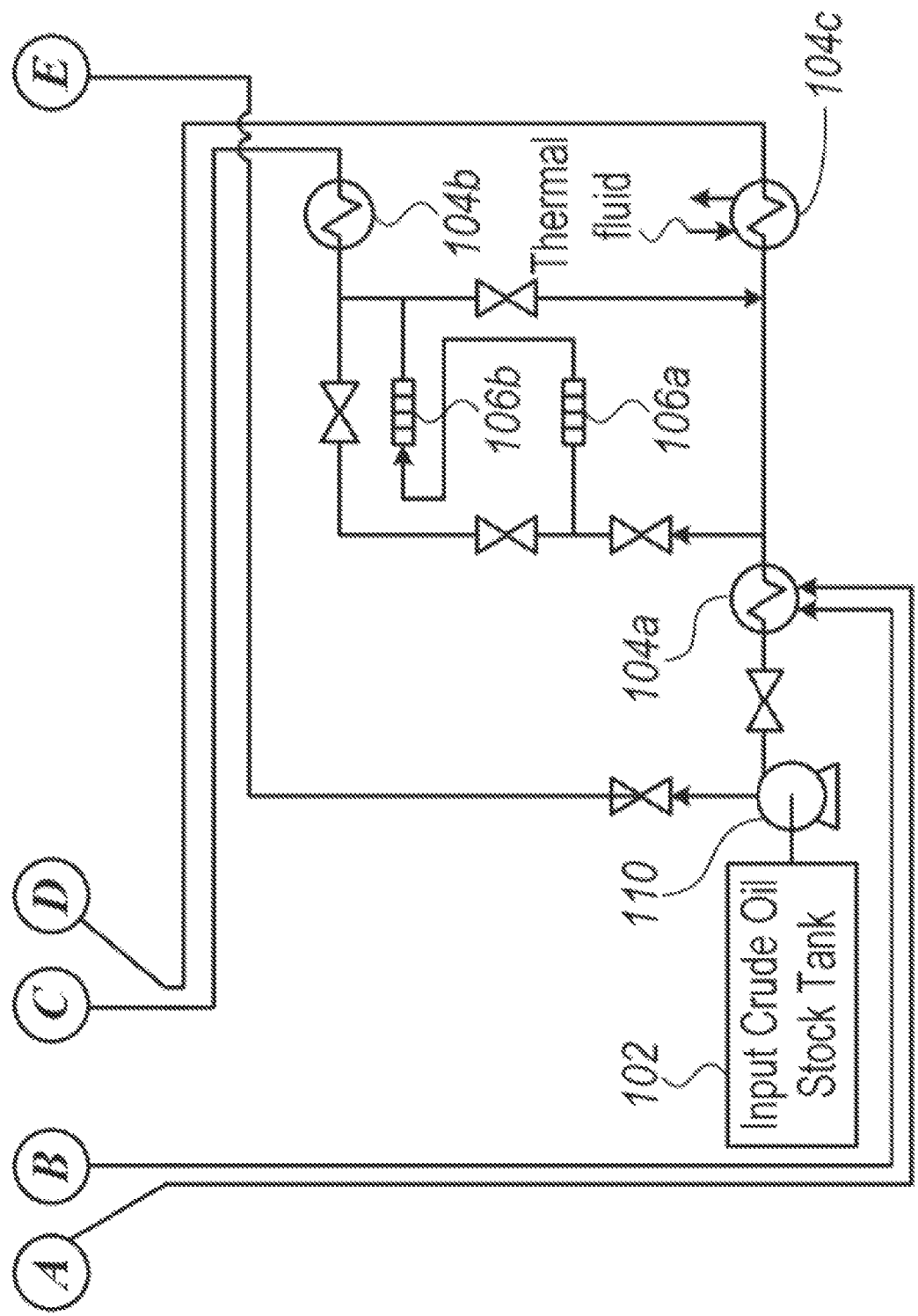
Figure 1B:
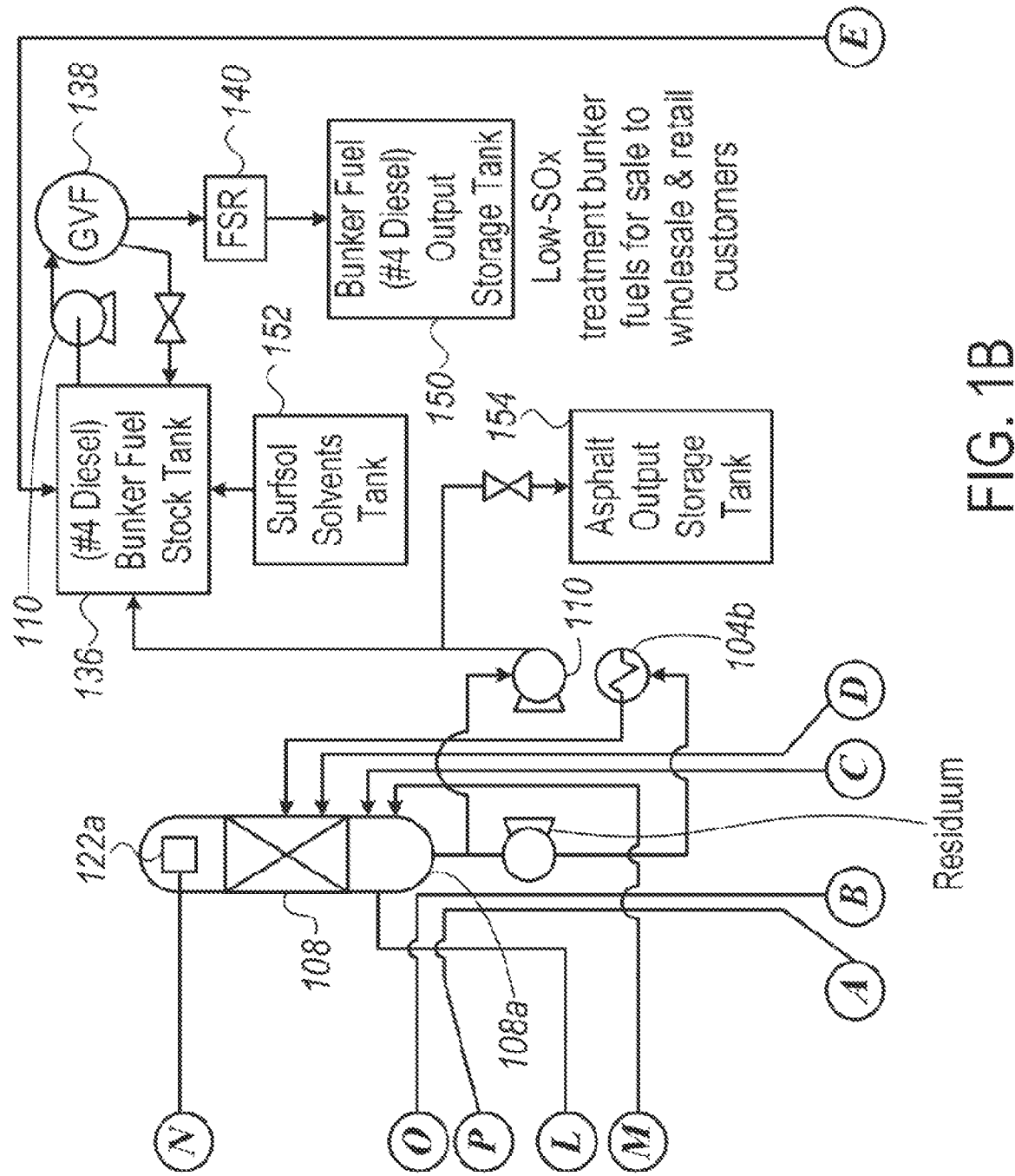
Figure 1C:
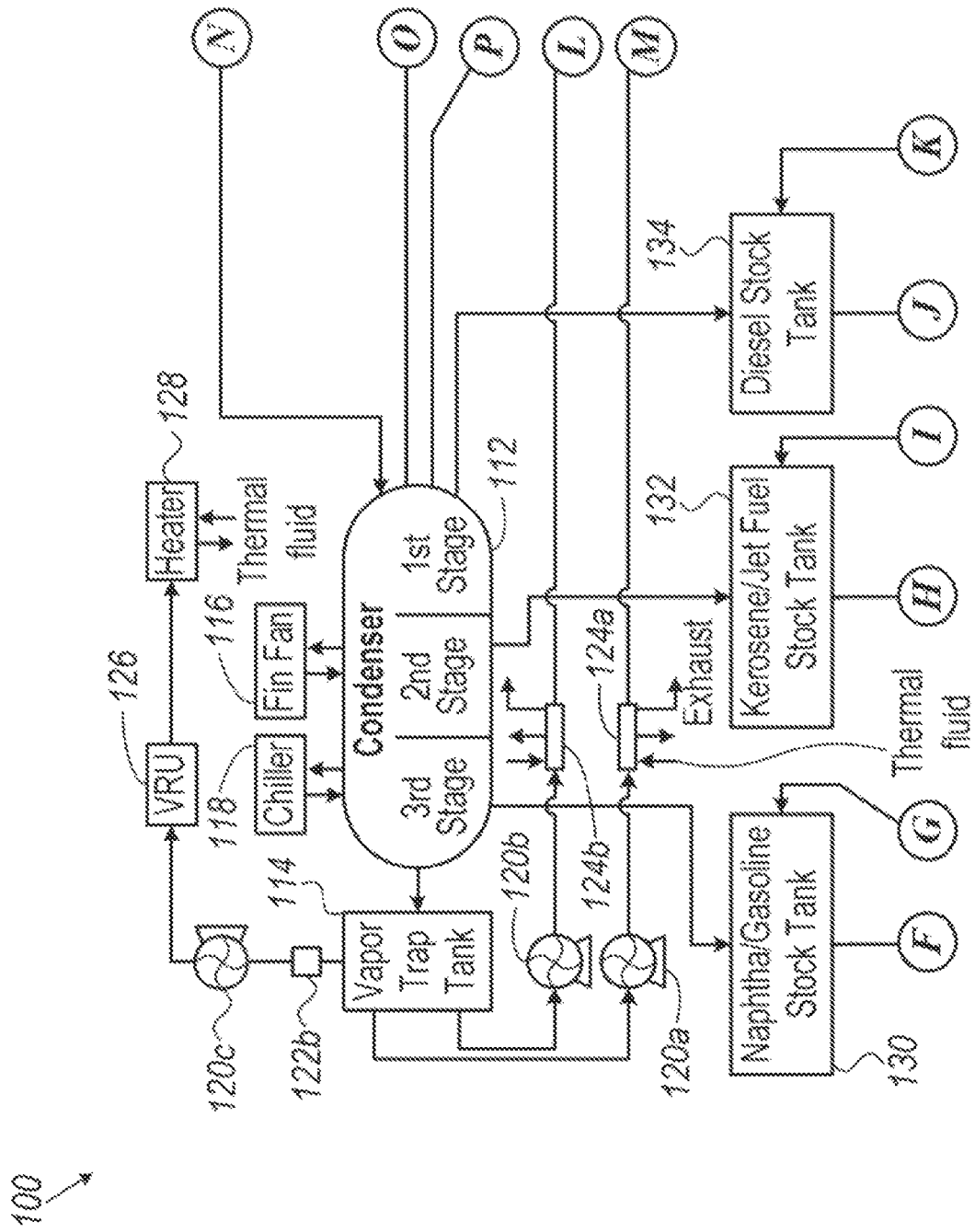
Figure 1D:
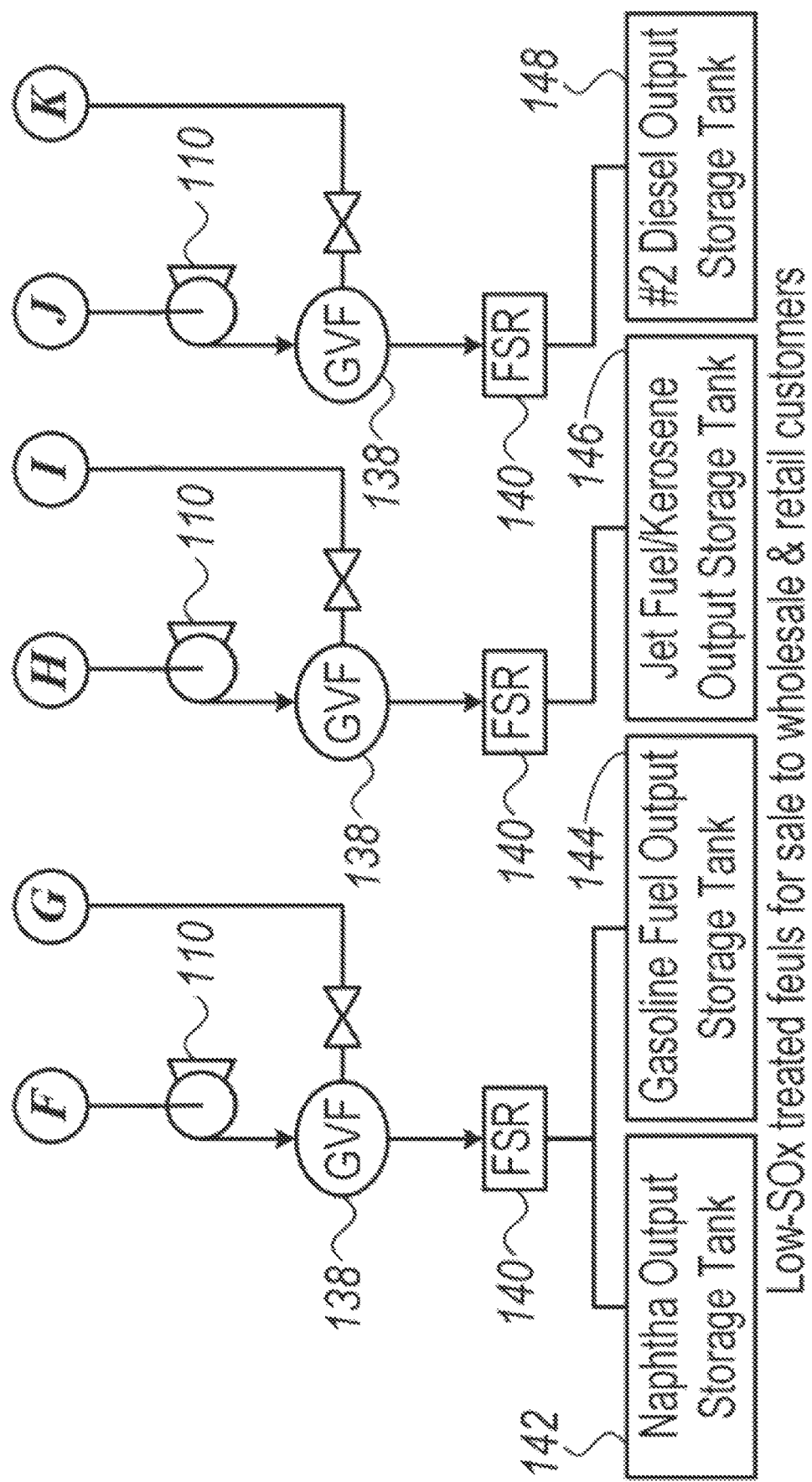

FIG. 1 is a flow diagram of the process (100) for refining crude oil to produce higher-purity, cleaner-burning designer fuels in a micro-crude oil refinery. FIGS. 1A-1D are enlarged quadrants of FIG. 1, wherein FIG. 1A is the lower right quadrant, FIG. 1B is the upper right quadrant, FIG. 1C is the upper left quadrant and FIG. 1D is the lower left quadrant. The connections between these quadrants are marked by unique encircles capital letters A-P, each letter marking continuity of the respective line across corresponding edges of adjacent quadrants. Thus each line may be traced both within FIG. 1 and within and between FIGS. 1A-1D. Reference numbers of components are identical between FIG. 1 and FIGS. 1A-1D.

FIG. 1A illustrates the initial flow of crude oil through the process (100). The crude oil coming from the crude oil stock tanks (102) with ambient temperature of 120-200° F. and pressure of 100-200 psi goes into the centrifugal pump or a positive displacement pump (110) where pressure is raised to 200-1000 psi. The crude oil from the centrifugal pump or positive displacement pump (110) may either flow to a pair of electrical heaters (106a & 106b) for thermal cracking or to a heat exchanger (104) in which the movement of crude oil is controlled by a plurality of valves. When the crude oil passes through the preheat heat exchanger (104), it is preheated from the first stage of the multi-stage horizontal reverse condensate condenser (112) to 200-500° F. Then, the hot crude oil may either pass through a first path or the second path to raise the temperature to 200-600° F. When the crude takes the first path, it passes through the first electric heater (106a) and the second electric heater (106b) controlled by a plurality of valves and passes through the heat exchanger (104) and reaches the reactor (108). When, the crude takes the second path, it passes directly through another heat exchanger (104), heated using thermal fluids, and enters into the reactor (108).

The FIG. 1B illustrates the reactor section and outputs of the bunker fuel and asphalt from the reactor. The crude oil from the crude oil stock tanks (102) may pass through the centrifugal pump or positive displacement pump (110) to a bunker fuel stock tank (136), where the crude oil comes in contact with a Surfsol solvent injected from the Surfsol solvent tank (152). The hot crude with a temperature range from 200-600° F. enters the reactor (108) through plurality nozzles and devices which reduces the molecular size of the crude to 10-120 microns.

The pressure inside the reactor (108) is at a range of 0-29 inches of Hg. The atomized crude particles inside the reactor (108) is sprayed into the vacuum condition at the pressure of 200-1000 psi and temperature of 200-600° F. results in spray-cracking and vacuum-flashing of the crude oil. This technique of spray-cracking and vacuum-flashing breaks the complex molecules or the heavy chain hydrocarbons into simpler or light chain molecules. The vacuum flashing of the crude drops the boiling point of the crude so the temperature of the crude reaches 300-80° C. at this stage. The lighter chains are carried out of the reactor (108) through the separator (122a) into the multi-stage horizontal reverse condensate condenser (112) and the heavier carbon chain are forced to drop to the sump (108a) of the reactor (108). The residuum is collected into the sump (108a) containing heavier carbon chain compounds, which are re-circulated back into the reactor using the re-circulating centrifugal or positive displacement pump (110) to further extract the lighter chains from the crude. The residuum collected in the sump (108a) of the reactor is sent for a primary processing. The residuum is sent out from the sump (108a) of the reactor through the centrifugal or positive displacement pump (110) and heat exchanger (104). The primary processing involves recirculation of residuum throughout the process to further extract the desired components from the crude oil. Further, the first residuum is sent for a secondary processing by again re-circulating the first residuum to obtain a chemical-rich residuum. The secondary processing yields a highly concentrated chemical-rich residuum from which many chemicals, industrial and consumer petroleum products may be derived. The heavier end chains collected in the sump (108a) of the reactor after the recycling process are pumped as bunker fuel (#4 diesel) and collects into the bunker fuel stock tank (136). The asphalt may also be extracted from the chemical-rich residuum, which are collected into the asphalt output storage tank (154). Other by-products like paraffins can be separated in liquid form and may be added with designer fuels like Bunker fuel, Jet fuel, Diesel fuel and Gasoline fuel to impart beneficial characteristics to the fuels.

FIG. 1C illustrates the multi-stage horizontal reverse condensate condenser section and corresponding outputs from each stage. The vapor leaves from the reactor (108) and enters the multi-stage horizontal reverse condensate condenser (112) containing at least three stages to separate the crude oil into targeted designer fuels. The vapor containing $C_1$-$C_4$ carbon chain does not condense in the multi-stage horizontal reverse condensate condenser and these lighter chains may be recovered into the vapor trap tank (114). The vapor from the vapor trap tank (114) is drawn by the small blower (120c) through a separator (122b) to remove any entrapped gases. The small blower (120c) sends the gases from the vapor trap tank (114) into a vapor recovery unit (VRU) (126) to be burned by the process heaters (128). The methane and other vapor are circulated from the vapor trap tank (114) by the main blowers (120a,120b). The pair of main blowers (120a,120b) increases the velocity and pressure of the gases which is passed through the pair of methane heaters (124a,124b) which uses thermal fluids, in order to raise the temperature of the gases equal to the temperature inside the reactor (108). The exhaust containing harmless gases which are released from the pair of methane heaters (124a, 124b) are opened into the atmosphere. This step will not result in cooling of the reactor. The heated gases from the methane heaters (124a, 124b) enter into the reactor (108) through plurality of nozzles from the sides of the reactor (108). These gases pass through the reactor carrying the atomized crude particles along with them at the velocity range from 3-12 feet per second and reach a separator (122a) inside the reactor. The shorter carbon chain molecules are easily passed through the separator (122a), while longer carbon chain molecules hit the separator (122a) and fall into the sump (108a) of the reactor (108).

The vapor from the reactor (108) enters into the multi-stage horizontal reverse condensate condenser (112). The multi-stage horizontal reverse condensate condenser (112) may have three to four stages according to the targeted designer fuels that are to be produced. The multi-stage horizontal reverse condensate-condenser condenses sideways flowing vapors through the condenser tube, such that the targeted low temperature of the condenser condenses the remaining vapor and drops them into the bottom section compartments of the condenser corresponding to the different fuel fractions contained in the crude oil. The conventional distillation towers heat up the boiled crude oil vapor to rise up in the vertical distillation towers, which condenses to produce various vapor fractions of petroleum fuels. On the other hand, in a reverse condensate condenser, the heated crude oil droplets are cooled in separate compartments, so that they fall down and condense at targeted temperatures to produce targeted fuel products that can be collected in separate storage tanks. Since hot crude is cooled down as it crosses the condenser, compared to conventional oil refinery distillation columns that condense fuel as it rises, the Micro Crude Oil Refinery in the present invention uses a multi-stage horizontal reverse condensate condenser.

All the stages in the present invention as shown in FIG. 1C are targeted with the first stage taking the inlet temperature of the vapor from the reactor (200-600° F.) and condenses the vapor to a temperature range of 200-150° F. to produce diesel fuel (#2 diesel fuel) from the first stage of multi-stage horizontal reverse condensate condenser (112) which gets collected into the diesel stock tank (134). The cooling medium is obtained from the heat exchanger (104). The second stage takes the temperature 200-150° F. from first stage and uses a fin fan (116) or similar products to condense the vapor to 170-50° F. to obtain kerosene or jet fuel which gets collected into a Kerosene/Jet fuel stock tank (132). Further, the third stage uses chillers (118) or similar products to reduce the temperature from second stage (170-50° F.) to 60-20° F. to produce naphtha or gasoline fuel which is collected into a naphtha/gasoline stock tank (130). The targeted vapor that is condensed in respective stages collects into respective stock tanks are then pumped into targeted storage tanks.

FIG. 1D illustrates outputs of designer fuels through the Gas Void Fraction (GVF) (138) centrifuges and Fraction Sulphur Reducer (FSR) (140) into respective output storage tank of the process (100). The four to five fuel products extracted in the process are pumped from respective stock tanks using centrifugal or positive displacement pumps (110) into the GVF (138) density separator/centrifuge. The GVF is used as a polishing agent that targets final fuel molecule configurations by density—effectively ejecting and removing all unwanted densities of impurities and contaminants which are attached to the targeted fuel-molecules, which impurities/contaminants may degrade fuel performance and increase combustion emissions. The centrifuge polishing removes these unwanted attachments from hydrocarbon fuel molecules, thereby preventing them from being combusted to release toxic emissions into the atmosphere. When light crude oil is used as crude oil feedstock, the process will generate #4 diesel fuel, #2 diesel fuel, kerosene/jet fuel, Naphtha and gasoline fuel. These fuel products from the respective stock tanks are pumped through the gas void fraction (GVF) (138) centrifuges and may be re-circulated back into their respective stock tanks controlled through valves. The GVF (138) centrifuges removes unwanted carbon chain impurities based on the desired density of the fuel. The fuel products come in contact with desulfurization ester additives in the FSR (140) to remove unwanted pollutants. The additives reduce $SO_X$ emissions by up to 40% and reduce $NO_X$ emissions by up to 10%. The bunker fuel from the bunker fuel stock tank (136) is pumped through the GVF (138) and re-circulated to remove unwanted pollutants with $C_{20}$ carbon chain and below carbon chain and also $C_{50}$ and above carbon chains and then passed through FSR (140) and stored in bunker (#4 diesel) fuel output storage tank (150). The diesel fuel (#2 diesel fuel) from the diesel stock tank (134) is pumped through the GVF (138) and re-circulated to remove unwanted pollutants with $C_{16}$ and below carbon chains and also $C_{20}$ and above carbon chains which then passed through FSR (140) and stored in diesel output storage tank (148). The Jet fuel or kerosene fuel from the Jet fuel/kerosene stock tank (132) is pumped through the GVF (138) and re-circulated to remove unwanted pollutants with $C_{10}$ and below carbon chain and also $C_{16}$ and above carbon chains which then passed through FSR (140) and stored in Jet fuel/Kerosene output storage tank (146). Naphtha or gasoline fuel from the naphtha or gasoline stock tank (130) is pumped through the GVF (138), followed by FSR (140) and further sent into two separate storage tank, one is gasoline output storage tank (144) and the other is naphtha output storage tank (142). The gasoline output storage tank (144) will remove the unwanted pollutants with $C_4$ and below carbon chains and also $C_9$ and above carbon chain which is sent to naphtha output storage tank (142). These designer fuel products may be directly pumped through the GVF (138) and FSR (140) to a truck for sale or may be stored in respective storage tanks to be used for various applications. These designer fuels pumped through the GVF (138) passes through a fraction sulphur reducer (FSR) (140) to remove most of the sulphur in the fuel product and are stored in respective storage tanks which may be sent for sale to wholesale market and retail customers. These higher-purity, cleaner-burning designer fuels with increased gas mileage burns cleaner, cooler with reduced per-gallon emissions of $SO_X$, $NO_X$ and other unwanted gases.

Figure 2:
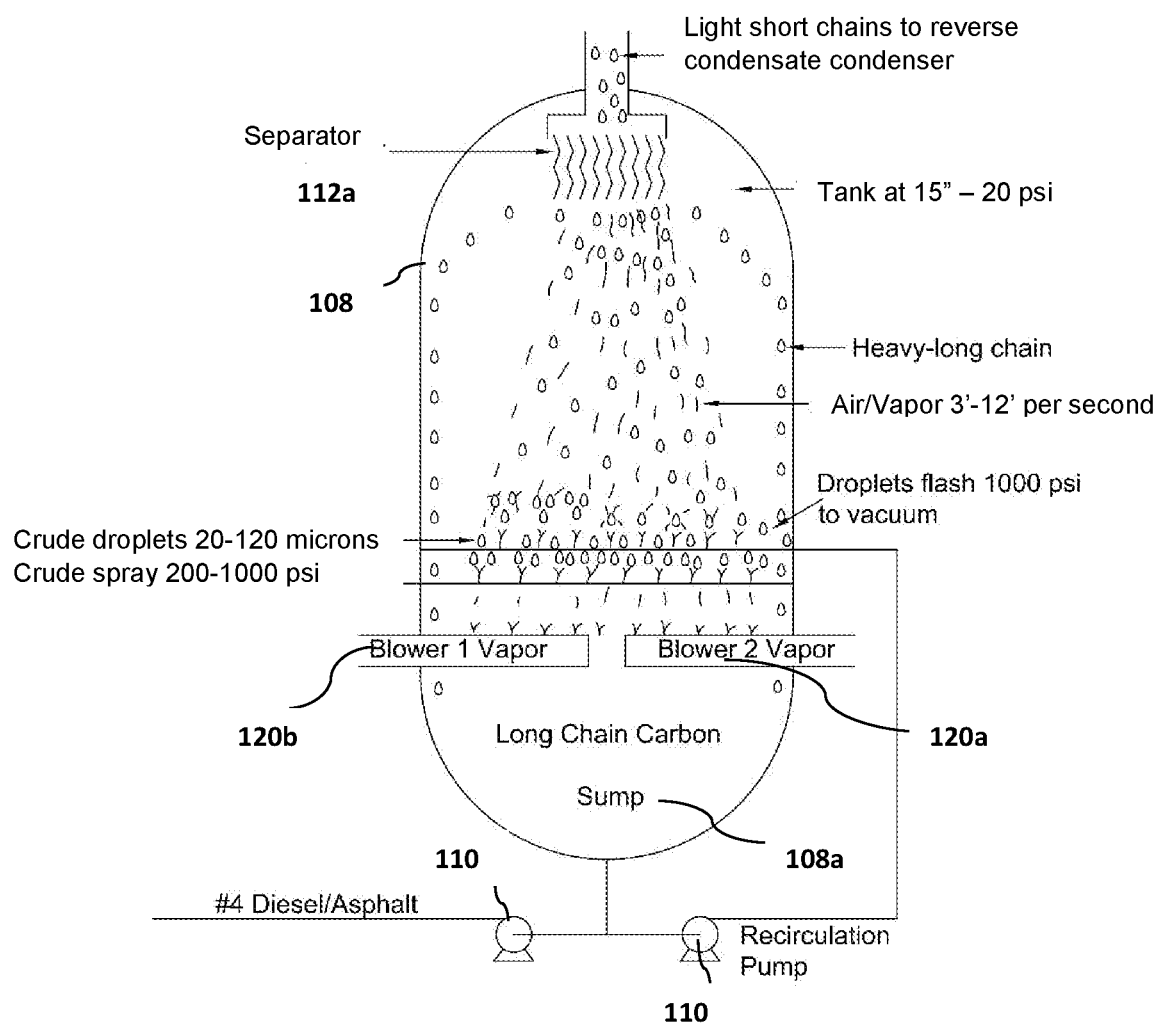
FIG. 2 is a diagram of the reactor used in the crude oil refining process according to an embodiment herein.

FIG. 2 illustrates a diagram of the reactor (108) used in the crude oil refining process (100) to separate out designer fuels according to an embodiment herein. The hot crude oil from the crude stage enters into the reactor (108) through plurality of nozzles and other devices, where the pressure inside the reactor is 0-29 inches of Hg, and gets converted into atomized crude droplets of particle sizes of 10-120 microns. The vapor from the vapor trap tank (114) enters into the reactor (108) through the pair of main blowers (120a, 120b). The vapor carries the atomized crude particles at a velocity of 3-12 feet per second to the separator (122a) located inside the reactor (108), where the atomized crude particles and the vapor are forced to fall into vacuum condition at the pressure of 200-1000 psi, which results in spray-cracking and vacuum-flashing at a pressure of 1000 psi. The spray-cracking and vacuum-flashing technique reduces hydrocarbon molecule sizes more efficiently and uses less energy than conventional refineries to crack hydrocarbons. The light short chains pass through the separator (122a) and are further passed into the multi-stage horizontal reverse condensate condenser (112). The separator (122a) forces the heavy long chain carbon to fall through the sides of the reactor and get collected into the sump (108a) of the reactor. The long chain carbon compounds collected in the sump (108a) are re-circulated back into the reactor using a centrifugal or positive displacement pump (110) for further recovery of the light chain ends. After the recycling step, the bunker fuel (#4 diesel fuel) and the asphalt are finally extracted.

The present invention discloses a process which is a combination of chemical, kinetic and heat-based energy efficient crude oil separation into higher-purity, cleaner-burning designer fuels with reduced emissions. The chemical process mixes viscosity-reductant additives, like the solvent, "Surfsol", with crude oil to separate out long-chain hydrocarbon-bonds that connect heavy asphaltenes, paraffin crystals, aromatic "contaminants" to the crude oil carbon chains. This treatment reduces the processing load by returning the lighter-end hydrocarbons into solution for further processing by subsequent kinetic and heat-based crude oil separation into shorter-chain hydrocarbon fuels. The kinetic process of Surfsol treatment is achieved by centrifugal or positive displacement circulating pumps which mix the input crude oil with the chemical additives and the crude oil, causing the aromatics to drop out the impurities from the lighter-ends, producing high-purity, high-value shorter-chain hydrocarbon fuels that burn cooler and more efficiently. Using Surfsol solvent as the crude oil viscosity-reductant additive is one of the cheapest ways to treat asphaltenes and paraffins, compared to conventional energy-intensive refineries that require ultra-high temperatures and pressures. The insertion of GVF centrifuges cause centrifugal polishing of the designer fuels to only contain shorter carbon chains $C_1$-$C_5$ and removes longer $>C_{24}$ carbon chains and other undesired impurities attached to the hydrocarbon molecules. The advanced centrifuges operate by density differentials. It may have dial-in control panel in the GVF centrifuges to produce output fuel with desired density values by knocking out every molecule in the stream that does not have the density of the desired molecules. The post treatment with ester additives removes $SO_X$, $NO_X$ and other remaining contaminants. The heat-based process in the present invention takes place at a temperature less than 550° F. and <20-psi operating pressure flashes off the last remaining gaseous hydrocarbon fractions from the heavy oil residuum into higher-purity fuels at lower-pressures and temperatures than conventional high-pressure >900-psi and high-temperature >1100° F. crude oil refinery using fractionation distillation methods.

The crude oil molecules generally require electrons to be in a state of equilibrium. The conditioned Surfsol chemical additive is usually made with surfactants and conditioned water, where the conditioned fluid acts as the carrier-fluid. The Surfsol solvent mechanically receives electrons from electric current generated in real-time by the movement of the fluid through the mechanical conditioner. The Surfsol conditioned-solvent converts hydrophilic oil attached to water molecules into hydrophobic oil that prevents oil molecules from bonding with water. In cases when the water molecules in conditioned fluids are overcharged with electrons, the fluid molecules will give off or donate to other deficient water molecules or go to ground, such that the fluid's molecular electrons attain a state of equilibrium. On the other hand, when water molecules in Surfsol solvent are electron-deficient, the water will absorb electrons from ground; such that the water's molecular electron state can be in equilibrium. The harmonic balance of water electrons allows water-molecules to shrink to small and round size, which enables the water molecules to carry more Surfsol chemical additives and increase contact with the crude oil molecules. The harmonic balance of water electrons in Surfsol solvent breaks the emulsion of water-surrounding oil molecules, so that the surfactant can penetrate and break the hydrocarbon bonds holding onto the asphaltenes, paraffin and aromatic molecules, releasing these molecules from the surrounding water molecules at ambient temperature without any costly heat expenditure to condense the water from the oil. The conditioned water penetrates the emulsion surrounding the crude and breaks off the paraffin and asphaltene molecules producing higher-purity hydrocarbon molecules in the process.

The process produces high purity designer fuel based on the input density of crude oil and the desired output densities of the designer fuels. The process may manipulate the densities of each of the fluids passing through the process beginning from the input crude oil densities to the desired preferred output fuel densities in order to obtain high-purity commercial fuels in the industry with low-price of production.

The entire crude oil refining process of producing higher-purity, cleaner-burning designer fuels from the crude oil does not release any harmful emissions into the atmosphere. The lighter-end $C_1$-$C_4$ aromatic gases recovered in the process are used as cleaner-burning fuel to burn the process's own heaters, whose combustion exhaust gases are vented to the atmosphere. The methane or Utility-grade natural gas-fired process-heater is the only component in the process that vents its combusted exhaust gas to the atmosphere (less than 7 ppm NOx). In the situation when there is no sufficient amounts of aromatics contained in the crude oil to extract, then to make up for such short-fall, the process may open valves for utility-delivered natural gas to run the heater. The aromatics may then be added to the utility gas at a higher pressure. Thus, this process has an excellent gas recycling step than other conventional methods, which enables efficient utilisation of energy.

Figure 3:
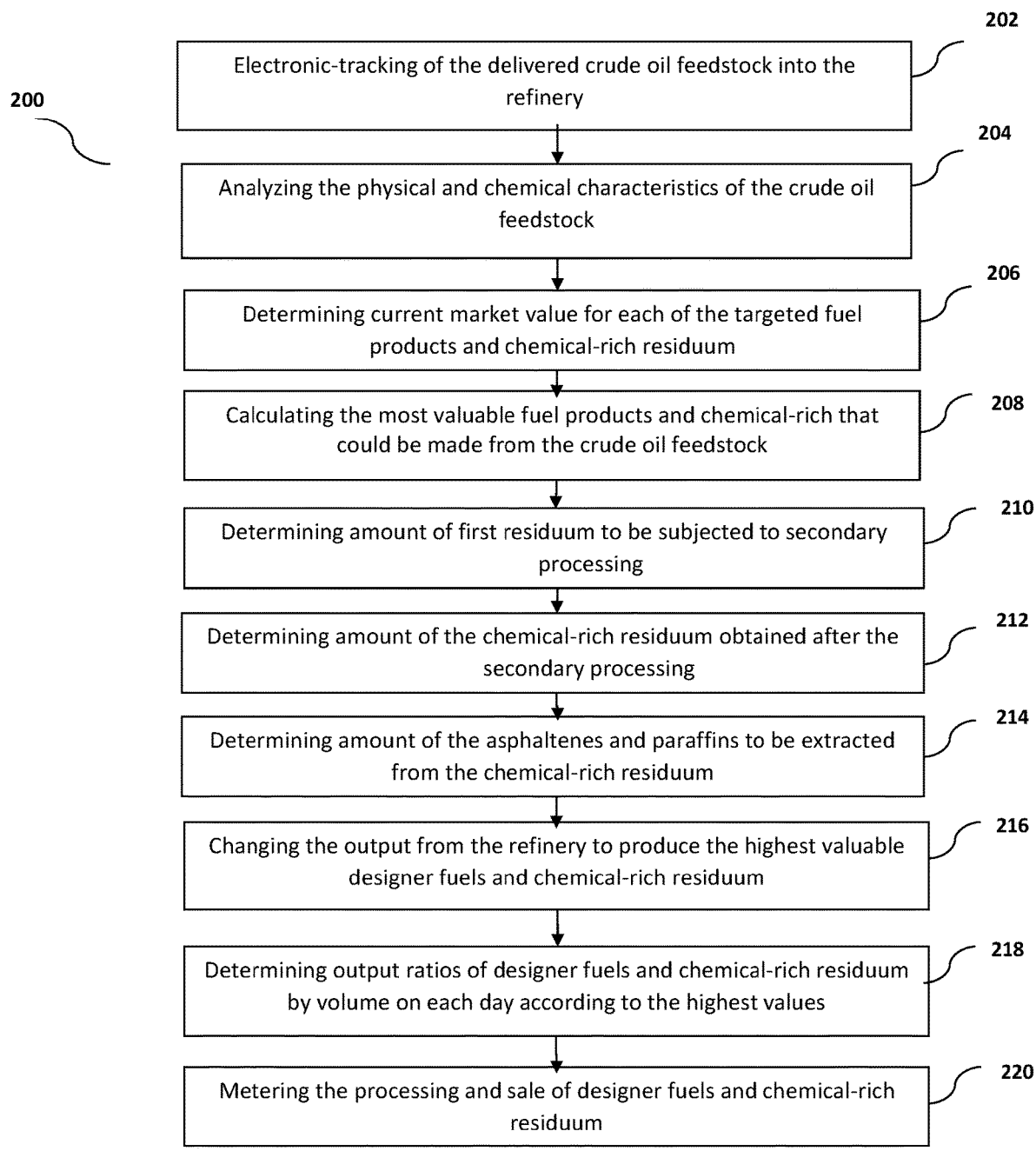
FIG. 3 is a flow chart that illustrates the method of automating daily selection of the designer fuels and chemical-rich residuum from the process.

FIG. 3 is a flowchart that illustrates the automation method (200) using a production auditing or accounting control system operated with a software program that measures, records and counts the crude oil and additive volumes entering the facility and the output of the higher-purity, cleaner-burning designer fuels. The first step is electronic tracking of the delivered crude oil feedstock into the stock tanks of the refinery (202). The next step is analysing the physical and chemical characteristics of the crude oil feedstock (204). The physical and chemical characteristics of the crude oil feedstock includes Viscosity, API Gravity, Sulfur-content, Paraffin-content, Asphaltene-content, Aromatics-content, Water-content, Sediment-content, vanadium-content, nickel-content. Based on these characteristics, the automation process determines the constituent contents which may be removed from the crude oil and determines the amount of higher-purity, cleaner-burning designer fuels and its composition that can be produced. Further, determining the amount of heavy oil residuum and unwanted crude oil impurities and contaminants left-over after the production of these designer fuels. These characteristics also assist in calculating the heat and pressure requirement for the process, the thicker crude oil generally requires more heat and pressure to move through the pipes. It is followed by determining the current market value and the price trends of each of the targeted fuel products and chemical-rich residuum (206). The next step is calculating the most valuable fuel products that could be made from crude oil feedstock based on the analysed characteristics of crude oil feedstock and price trends (208). By cross-checking the real-time commodity price of each of the fuels, which may be bunker, jet, diesel, gasoline fuel to determine which fuel has the best price for the refinery to make the maximum sales revenue by producing the most in-demand highest-value fuel of the day. Further, it determines the amount of first residuum to be subjected to secondary processing (210) and followed by determining amount of the chemical-rich residuum obtained after the secondary processing (212). It calculates amount of the asphaltenes and paraffins to be extracted from the chemical-rich residuum (214). The next step is changing the output from the crude oil refinery to produce the highest valuable fuel product and the chemical-rich residuum which is calculated in percentage ranges (216). The output ratios of the fuel products and chemical-rich residuum by volume are measured each day according to the highest valuable fuel product that generates the maximum sale for the day (218). Finally, metering the processing and sale of higher-purity, cleaner-burning designer fuels and chemical rich residuum (220) is carried out by recording the weights and/or volumes of crude oil inputs, Surfsol solvent additive inputs, desulfurization ester additive inputs, electrical and thermal energy inputs and corresponding fuel product and chemical by-product outputs. The identification is done using dye color or components for online purchases of the designer fuels which is to be barreled. The designer fuels may be sold to wholesale markets or retail customers. The fuels may also be sold in online market of speculators who wants the fuel as collateral or may be sold to actual customers who are anxious about oil and gas supplies being interrupted during an emergency and wants to use corporate fleet service to bring lower-cost wholesale gas prices to retail store customers.

Moreover, the automation process calculates the amount of high value fuel and chemical-rich residuum that is generated in the process by following steps: initially testing the mass, volume make-up and the characteristics of the input crude oil feedstock. It is then followed by calculating the total volume of finished output fuels producible from the given amount of input crude oil. Then, subtracting the aggregated volume and weight totals of components comprising the output designer fuels. The next step is equating the volume and weight of all the left-over chemicals and carbon chains in the heavy oil waste residuum. The primary processing of the heavy oil residuum is carried by recycling, where the lighter ends are further removed by retreatment with crude oil, emulsion, and aromatics. Then, based on the amount of chemical left-overs in the residuum, the process calculates the amount of higher-value finished fuels that can be produced by secondary processing of the residuum. The secondary processing of the heavy ends completely releases and extracts as much recoverable light-ends and carbon chain fuels that are present in the first residuum. Thus, the secondary processing yields more finished fuels and highly-concentrated chemical-rich residuum which can be used as hot or cold road asphalt.

In addition, the process calculates the amount of the left over asphaltenes that can be obtained from the chemical-rich residuum. It also calculates the amount of left-over paraffin that may be obtained from the heavy oil residuum and may use this paraffin in liquid form in order to add beneficial characteristics to the fuels like bunker, jet, gasoline and diesel fuel. The final processing for extraction of remaining light-ends, paraffin and asphaltenes from the first residuum of processed crude oil produces a more highly-concentrated and higher-density secondary residuum containing higher-value chemicals that can be extracted by third-parties using tertiary residuum separation processes.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

WORKING EXAMPLES

Example 1: The table as shown below is an example, that illustrates the breakdown of the higher-purity, cleaner-burning designer fuels (in %) which may be produced from the process, when light crude oil having >27 API gravity is used as the input crude oil feedstock. The ratio amounts of different fuels produced in the process is completely based upon the characteristics of the input crude oil, including viscosity, gravity, sulfur content, asphaltene content, paraffin content. Based on these parameters, the automation process calculates the most optimal mix of output fuel depending on the real-time price and demands of the fuels. If the input crude oil has an API of <15-gravity, which Isa very heavy and thick crude oil, that would produce >60% of its volume as Asphalt and <40% for fuels. If the Crude oil has an API of >25 gravity, which is light crude oil, then that will produce a wide range of fuels as shown in table below. This table may be used for determining profits and the amounts of ester additives to be added into the finished fuels.

TABLE 1

Annual fuel production ratios from the process
ANNUAL FUELS PRODUCTION RATIOS

|  | % of Output | Finished Fuel | Gal. Produced |
|---|---|---|---|
|  | 5% | Residuum Bitumen/Asphalt | 7,560,000 |
| 3,600,000 Barrels of Input Crude Oil | 10% | Bunker Fuel Red Diesel | 15,120,000 |
|  | 35% | #2 Diesel Heating Oil | 52,920,000 |
| 151,200,000 Gallons of Bunker/Jet/ Diesel/Gasoline | 30% | Jet Fuel A/B Naptha | 45,360,000 |
| Fuels Output | 20% | Gasoline | 30,240,000 |
| % of Production | 100% | Total Gal. Produced | 151,200,000 |

Example 2: The table 2 as shown below discloses the density ranges of the designer fuels and the by-products that may be produced in the process from the given input of crude oil feedstock based on the physical and chemical characteristics of the input crude oil. The separated hydrocarbon fuel product is considered to be "pure" if the recovered hydrocarbon components have the same or substantially the same density range defining that component.

As shown in the table 2, the gasoline having a density range of 45-49 lb/ft$^3$ or 715-780 kg/m$^3$ is therefore considered to be a "pure" fuel product. The high purity output fuels produced in the process are produced by using the centrifuge settings to separate out the hydrocarbon-chains having the dialed-in or preferred density value that defines a high-purity bunker, jet, diesel and gasoline fuel with little or no contaminants attached to the hydrocarbon molecules.

TABLE 2

Density ranges of the designer fuels and
the by-products produced in the process

| | Density@15° C. -p- | | Specific Volume -v- | |
|---|---|---|---|---|
| Fuel | (kg/m$^3$) | (lb/ft$^3$) | (m$^3$/1000 kg) | (ft$^3$ per ton) |
| Butane (gas) | 2.5 | 0.16 | 400 | 14100 |
| Coke | 375-500 | 23.5-31 | 2.0-2.7 | 72-95 |
| Diesel 1D[1)] | 875 | 54.6 | 1.14 | 40.4 |
| Diesel 2D[1)] | 849 | 53 | 1.18 | 41.6 |
| Diesel 4D[1)] | 959 | 59.9 | 1.04 | 36.8 |
| EN 590 Diesel[2)] | 820-845 | 51-53 | 1.18-1.22 | 42-43 |
| Fuel Oil No. 1[3)] | 790-850 | 47-53 | 1.2-1.3 | 42-47 |
| Fuel Oil No. 2[3)] | 810-940 | 51-59 | 1.1-1.2 | 38-44 |
| Gas oil | 825-900 | 51-56 | 1.1-1.2 | 36-43 |
| Gasoline | 715-780 | 45-49 | 1.3-1.4 | 45-49 |
| Heavy fuel oil | 800-1010 | 50-63 | 1.0-1.3 | 35-44 |
| Kerosene | 775-840 | 48-52 | 1.2-1.3 | 42-46 |
| Natural gas (gas) | 0.7-0.9 | 0.04-0.06 | 1110-1430 | 39200-50400 |
| Propane (gas) | 1.7 | 0.11 | 590 | 20800 |

What is claimed is:

1. A system for refining crude oil to produce high purity, cleaner-burning targeted fuels in a micro oil refinery, the system comprising a crude section; a vapor section; and a condensate section, wherein the crude section comprises:
a crude oil stock tank, for storing crude oil feedstock;
a plurality of heat exchangers, configured to heat crude oil coming from the crude oil stock tank to optimum temperature range;
a chemical additive tank, configured to store a viscosity-reductant additive, to be contacted with crude oil so as to breakdown heavy chain hydrocarbons in the crude oil to light chain hydrocarbon;
a plurality of centrifugal pumps or a positive displacement pump, configured to properly mix the crude oil with the viscosity-reductant additive;
a reactor, configured and operative for spray cracking and vacuum flashing of the crude oil so as to separate out the heavy chain hydrocarbon, the light chain hydrocarbon and by-products;
a plurality of valves, configured to control the flow of crude oil through the heat exchangers to the reactor;
the condensate section comprises:
a multi-stage horizontal reverse condensate condenser, configured to allow input of light chain hydrocarbon from the reactor, in the form of vapor, and including at least three stages or compartments, to be cooled separately at different specific temperatures so as to condense the vapor into targeted fuel products, and further configured to pass on non-condensed vapors and gases;
a plurality of cooling devices, each connected to a corresponding one of the stages or compartments of the multi-stage horizontal reverse condensate, to cool it to a specific temperature;
a plurality of fuel stock tanks, each configured to collect a corresponding one of the targeted fuel products coming from the multi-stage horizontal reverse condensate condenser;
a plurality of gas void fraction (GVF) centrifuges, each configured to operate by density differentials and centrifugal polishing to separate targeted fuels of desired density value and hydrocarbon molecules of desired purity values;
a plurality of output storage tanks, each configured to store respective targeted fuel products and by-products before being sent for sale;
the vapor section comprises:
a vapor trap tank, configured to collect the non-condensed vapor and gases passed on from the multi-stage horizontal reverse condensate condenser;
a plurality of blowers, each configured to draw vapor from the vapor trap tank and to increase its velocity and pressure;
a plurality of methane heaters, each configured to receive vapor from a corresponding one of said blowers and to heat it so that it may be re-circulated into the reactor;
a separator, configured to remove any non-condensable gases from the vapor and gases collected in the vapor trap tank; and
a process heater, configured to receive non-condensable gases from said separator, through a vapor recovery unit, and to burn them.

2. The system as claimed in claim 1, wherein the targeted fuels are selected from a diesel fuel, a bunker fuel, a jet/kerosene fuel, a naphtha fuel and a gasoline fuel, a grade 2 diesel fuel (#2 diesel), a grade 4 diesel fuel (#4 diesel).

3. The system as claimed in claim 1, wherein the system is a closed-loop system, the system recycles the crude oil to extract all components separated and released from the crude oil and the gases extracted from processed crude oil are used to fuel the process heaters.

4. The system as claimed in claim 1, wherein the by-products are selected from asphalt, paraffin, chemical-rich residuum.

5. The system as claimed in 1, wherein the ideal fuel densities of the targeted fuels at temperature of 15° C. are in the range from 0.7 kg/m³ to 1010 kg/m³.

6. A process for refining crude oil to produce higher-purity, cleaner-burning targeted fuels in a micro-crude oil refinery, the process comprising:
a crude stage;
a vapor stage;
a condensate stage; and
a residuum stage,
wherein
the crude stage comprises:
Drawing crude oil from a crude oil stock tank, with an ambient temperature of 120-200° F. and an ambient pressure of 100-200 psi, and raising its pressure to 200-1000 psi by a centrifugal or positive displacement pump;
passing the crude oil from the centrifugal or positive displacement pump, under control of a plurality of valves, to either a bunker fuel stock tank or to a pre-heat heat exchanger;
injecting a viscosity-reductant additive into the bunker fuel stock tank and mixing it with crude oil therein;
pre-heating, in said preheat heat exchanger, the crude oil passed thereto to a temperature of 200-500° F.;
passing the crude oil from the preheat heat exchanger into a reactor, under control of a plurality of valves, either through a pair of electric heaters or through each of a plurality of heat exchangers, to raise the temperature of the crude oil to a temperature of 200-600° F.;
keeping the pressure inside the reactor in a range of 0-29 inch of mercury;
forcing the crude oil through a plurality of nozzles to be sprayed into the reactor as atomized crude particles, having sizes of 10-120 microns; spraying the atomized crude particles into vacuum condition, with the atomized crude particles entering the reactor at a pressure range of 200-1000 psi and temperature range of 200-600° F., resulting in spray-cracking and vacuum-flashing of the atomized crude particles;
separating the atomized crude particles, after said spray-cracking and vacuum flashing, into light end chains and heavy end chains and passing the light end chains, in the form of vapor, through a separator inside the reactor into a multi-stage horizontal reverse condensate condenser, while the heavy end chains fall through sides of the reactor and are collected into a sump of the reactor as a residuum;
wherein the vapor stage comprises:
recovering the light end chains in form of vapor from the multi-stage horizontal reverse condensate condenser into a vapor trap tank;
passing part of the vapor collected in the vapor trap tank through a vapor recovery unit (VRU) to a process heater, to be burned therein;
passing another part of the vapor collected in the vapor trap tank, through a pair of blowers and a corresponding pair of methane heaters, for raising the temperature of the gases, and further through a plurality of nozzles into the reactor;
letting the vapor that passed through said plurality of nozzles carry said atomized crude particles, at a carrying velocity range of 3-12 feet per second, to the separator inside the reactor, to enhance said separating;
wherein the condensate stage comprises:
letting the vapor from the reactor pass through at least three stages of the multi-stage horizontal reverse condensate condenser, the multi-stage horizontal reverse condensate condenser, to convert the vapor into targeted fuels;
condensing the vapor into diesel fuel in a first stage of the multi-stage horizontal reverse condensate condenser, by reducing its temperature from an inlet temperature in range of 200-600° F. to an optimal range of 200-150° F., using a cooling medium from the pre-heat heat exchanger;
condensing the vapor into jet- or kerosene fuel in a second stage of the multi-stage horizontal reverse condensate condenser, by reducing its temperature from the range of 200-150° F., obtained in the first stage, to an optimal range of 170-50° F., using a fin fan or similar cooling;
condensing the vapor into naphtha fuel and/or gasoline fuel in a third stage of the multi-stage horizontal reverse condensate condenser, by reducing its temperature from the range of 170-50° F., obtained in the second stage, to an optimal range of 60-20° F., using chillers or similar cooling equipment;
collecting the diesel fuel from the first stage of the multi-stage horizontal reverse condensate condenser into a diesel fuel stock tank;
collecting the jet- or kerosene fuel from the second stage of the multi-stage horizontal reverse condensate condenser into a jet- or kerosene fuel stock tank;
collecting the naphtha- and/or gasoline fuel from the third stage of the multi-stage horizontal reverse condensate condenser into a naphtha and/or gasoline stock tank;
passing each targeted fuel from its respective stock tank through a corresponding gas void fraction (GVF) centrifuge, each of the GVF centrifuges operating by density differentials and centrifugal polishing to separate out targeted fuels of desired density values and hydrocarbon molecules of desired purity values;
re-circulating each targeted fuel from the respective GVF centrifuge back into the respective stock tank;
sending each targeted fuel from the respective GVF centrifuge into a respective fraction sulfur reducer (FSR), wherein said targeted fuel comes in contact with a desulfurization ester additive, to reduce its sulfur contents, and one of the FSRs also functions to separate gasoline fuel from naphtha fuel;
collecting each targeted fuel from the corresponding FSR into a respective output storage tank;
and wherein the residuum stage comprises:
collecting the residuum in the sump of the reactor;
re-circulating the residuum collected in the sump back into the reactor;
sending the residuum for a primary processing to obtain a first residuum, the primary processing being performed by re-circulating the residuum throughout the process, sending the residuum from the sump of the reactor through the plurality of centrifugal or positive displacement pumps and plurality of heat exchangers;
sending the first residuum for a secondary processing, by re-circulating it through the process in the secondary processing to obtain a chemical-rich residuum; and
extracting asphalt and/or bunker fuel from the chemical-rich residuum and collecting it into an asphalt- and/or bunker fuel output storage tank, respectively.

7. The process as claimed in claim 6, wherein the viscosity-reductant additive is selected from the Surfsol solvent and/or other surfactants, emulsions, solvents or combinations thereof, whereby the viscosity-reductant additive chemically breaks the bonds of the asphaltenes and paraffins in the crude oil to reduce viscosity of the crude oil by up to 50% and increase American Petroleum Institute (API) gravity by more than 2-points.

8. The process as claimed in claim 6, wherein the desulfurization ester additive includes an ester solvent, the ester solvent being selected from the group of methyl octanoate, methyl laurate, trimethylolpropanetrilaurate, pentaeythritoltetralaurate and dipentaerythritolhexaheptanoate.

9. The process as claimed in claim 6, wherein the desulfurization ester additive is added to the targeted fuel at a ratio of 1 ounce of the desulfurization ester additive to 10 gallons of the targeted fuel.

10. The process as claimed in claim 6, wherein the desulfurization ester additive reduces the emissions of SOx by up to 40% and of NOx by up to 10% during combustion of the targeted fuels.

11. The process as claimed in claim 6, wherein the process heaters are heated with utility-grade natural gas, when there is a shortage in the gases extracted from processed crude oil.

12. The process as claimed in claim 6, wherein processing parameters in the production of the targeted fuels are based on input density of the crude oil and on the output density and desired relative volumes of the targeted fuels.

13. The process as claimed in 6, wherein the densities of the targeted fuels at a temperature of 15° C. are in the range from 0.7 kg/m$^3$ to 1010 kg/m$^3$.

14. The process as claimed in claim 6, wherein the process is a closed-loop process, wherein the system recycles the crude oil to extract all components separated and released from the crude oil and gases extracted from processed crude oil are used to burn the process heaters.

15. The process as claimed in claim 6, further comprising a method for automating daily selection of the targeted fuels and the chemical-rich residuum from the process, wherein the method comprises:
   electronic tracking of a crude oil feedstock delivered into the micro oil refinery;
   analyzing physical and chemical characteristics of the crude oil feedstock;
   determining current market value for the sale of each of the bunker fuel, jet fuel, diesel fuel, naphtha fuel, gasoline fuel and chemical-rich residuum;
   determining most valuable targeted fuels and the chemical-rich residuum obtained from the crude oil feedstock based on the physical and chemical characteristics;
   determining the amount of a first residuum to be subjected to a secondary processing;
   determining the amount of the chemical-rich residuum obtained after the secondary processing;
   determining the amount of asphalt to be extracted from the chemical-rich residuum;
   changing output from the process to produce most valuable targeted fuels and the chemical-rich residuum;
   determining output ratios of the targeted fuels and the chemical-rich residuum by volume on each day according to highest values;
   metering of the process and sale of targeted fuels and chemical rich residuum, the metering including—
   measuring weights and volumes of input crude oil feedstocks, viscosity-reductant additive and desulfurization ester additive, and the input electrical and thermal energy, and
   manipulating process-control valves so as to output amounts of the various targeted fuels and the chemical-rich residuum at desired ratios.

16. The method as claimed in claim 15, wherein the physical and chemical characteristics of the crude oil feedstock is selected from the group of Viscosity, API Gravity, density, Sulfur-content, Paraffin-content, Asphaltene-content, Aromatics-content, Water-content, Sediment-content, vanadium-content, nickel-content.

17. The method as claimed in claim 15, wherein the method is performed using a production auditing or accounting control system operated with a software program, the production auditing or accounting control system calculates profitable ratios of the most in-demand targeted fuels based on the physical and chemical characteristics of the input crude oil feedstock on a daily basis.

18. A reactor apparatus for spray-cracking and vacuum-flashing of crude oil in a system for refining crude oil to produce high purity, cleaner-burning targeted fuels, wherein the reactor apparatus comprises:
   A reactor;
   a plurality of nozzles, designed to let crude oil be sprayed into the reactor, thus forming atomized crude particles, so as to result, under low pressure conditions inside the reactor, in spray-cracking and vacuum-flashing of the atomized crude particles;
   a first input device, configured to receive gases and vapor from a first main blower and a second input device, configured to receive gases and vapor from a second main blower, said blowers and devices being further configured so that gases and vapor entering the reactor from the first and second input devices carry the atomized crude particles at a carrying velocity;
   a separator, disposed within the reactor and configured to separate the crude oil into light chain hydrocarbon and heavy chain hydrocarbon, letting the light chain hydrocarbons pass through the separator and forcing the heavy chain hydrocarbon to fall through the sides of the reactor;
   a sump at the bottom of the reactor, designed to collect the heavy chain hydrocarbon from the crude oil;
   a recirculation pump, connected to the sump and configured to re-circulate heavy chain hydrocarbon from the sump back into the reactor, through a plurality of nozzles, for further spray-cracking.

19. The reactor apparatus as claimed in claim 18, wherein the crude oil at the input of the nozzles is at a pressure of 200-1000 psi and a temperature of 200-600° F. and the atomized crude particles have a size of 10-120 microns.

20. The process according to claim 6, wherein the crude stage further comprises using thermal fluid heated by the first stage of the multi-stage horizontal reverse condensate condenser to heat the preheat heat exchanger.

* * * * *